United States Patent [19]

McLean

[11] 4,349,100
[45] Sep. 14, 1982

[54] CONVEYOR

[75] Inventor: John R. McLean, Richmond, Va.

[73] Assignee: Reynolds Metals Company, Richmond, Va.

[21] Appl. No.: 192,010

[22] Filed: Sep. 29, 1980

[51] Int. Cl.³ .............................................. B65G 13/06
[52] U.S. Cl. ..................................... 198/783; 198/790
[58] Field of Search ............... 198/780, 781, 783, 790; 193/33 A

[56] References Cited

U.S. PATENT DOCUMENTS 4,273,239  6/1981  Thwaites et al. ................. 198/781
4,278,166  7/1981  Pirro ................................. 198/790

Primary Examiner—John J. Love
Assistant Examiner—Douglas D. Watts
Attorney, Agent, or Firm—Lyne, Girard & McDonald

[57] ABSTRACT

A conveyor system is disclosed in which a plurality of free-wheeling conveyor rollers are rotated by means of a driven belt which intermittently contacts the conveyor rollers when driven motion is desired. The rollers may also be braked by means of a second belt member which may contact the conveyor rollers at those times when the driven belt is out of contact with the rollers.

6 Claims, 3 Drawing Figures

CONVEYOR

BACKGROUND OF THE INVENTION

Numerous conveyor systems for intermittently transporting articles along a distance are known. In many such systems, a driven belt comprises the conveyor surface. This belt is driven by chain or other means to cause the belt and the objects placed thereon to advance.

Maintenance of belt centering on intermittent drive systems can be difficult. Further, such systems have a large gap between the conveyor edge and adjoining surfaces, due to the relatively large radius of the driven pulleys around which the belt is passed. Additionally, providing positive braking for such systems increases system costs and puts stress on the driving mechanism.

It is thus a primary object of the present invention to produce an intermittently driven roller conveyor system which runs quietly and which may be braked without causing excessive stress to the driving mechanism.

THE PRESENT INVENTION

By means of the present invention, a conveyor system having these desired properties is disclosed.

The conveyor system of the present invention includes a conveying surface formed from a plurality of idler rollers, belt means for providing drive force to the idler rollers and means for intermittently contacting the idler rollers with the belt drive means. In one embodiment, belt brake means are also employed, with the means for intermittently contacting the belt drive means with the idler rollers contacting the belt brake means with the idler rollers when the idler rollers are out of contact with the belt drive means. Such a system permits the drive means to operate independent of the idler rollers and does not require positive braking of the drive means itself.

BRIEF DESCRIPTION OF THE DRAWINGS

The conveyor system of the present invention will be more fully described with reference to the drawings in which.

DETAILED DESCRIPTION OF THE PREFERRED EMBODIMENTS

Figure 1:
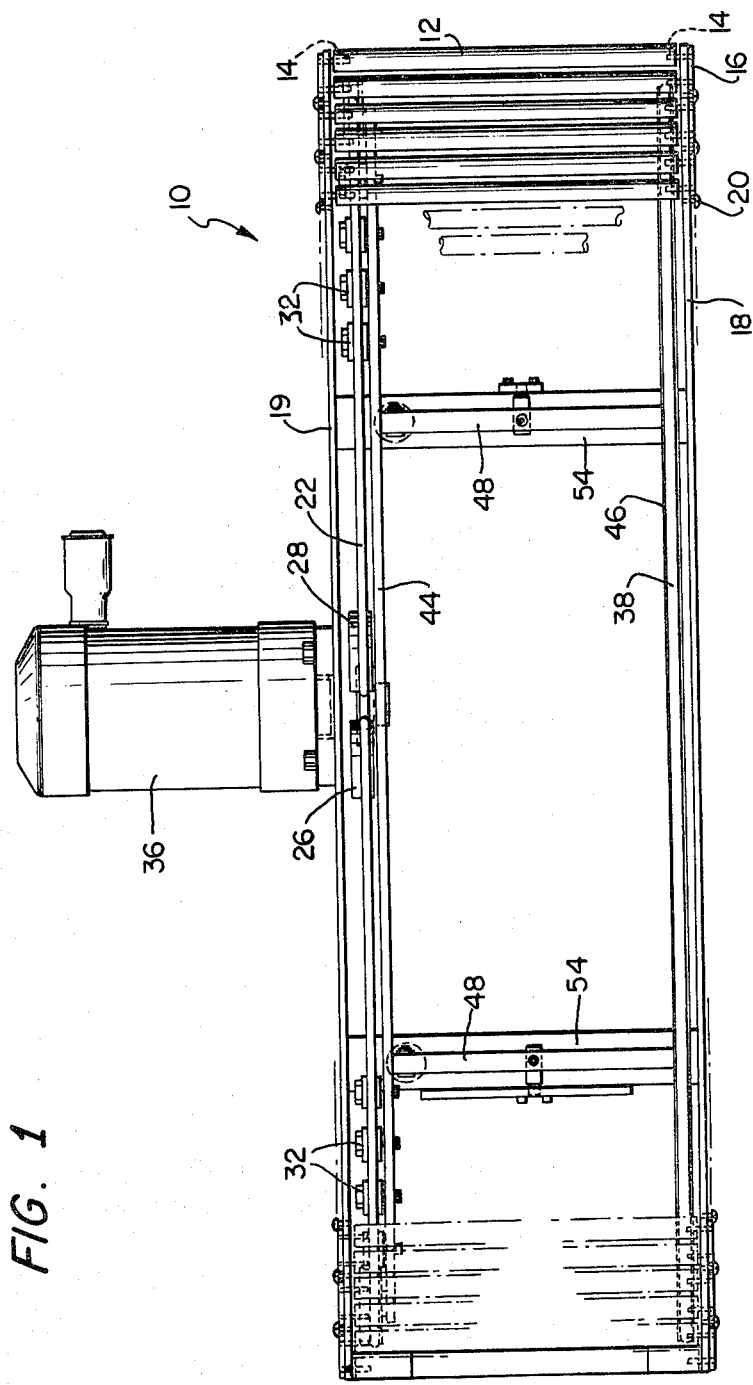
FIG. 1 is a top elevational view, with portions of the conveyor surface removed, illustrating the conveyor of the present invention.

Turning to the FIGURES, the conveyor system of the present invention is generally illustrated at 10. The conveyor 10 includes a plurality of idler rollers 12 forming the conveying surface. The rollers 12 are freewheeling and are mounted for rotation upon pins 14. One simple manner for mounting the rollers 12 is to mount chain link members 16 onto frame members 18 and 19 by means of fasteners 20 and to use the prongs 14 from the chain links 16 as supports for the idler rollers 12. This permits easy removal of individual rollers 12 when necessary, without the need for extensive dismantlement of the conveyor surface. Additionally, the chain links 16 provide a smooth, hardened precision surface for mounting of the idler rollers 12.

Figure 2:
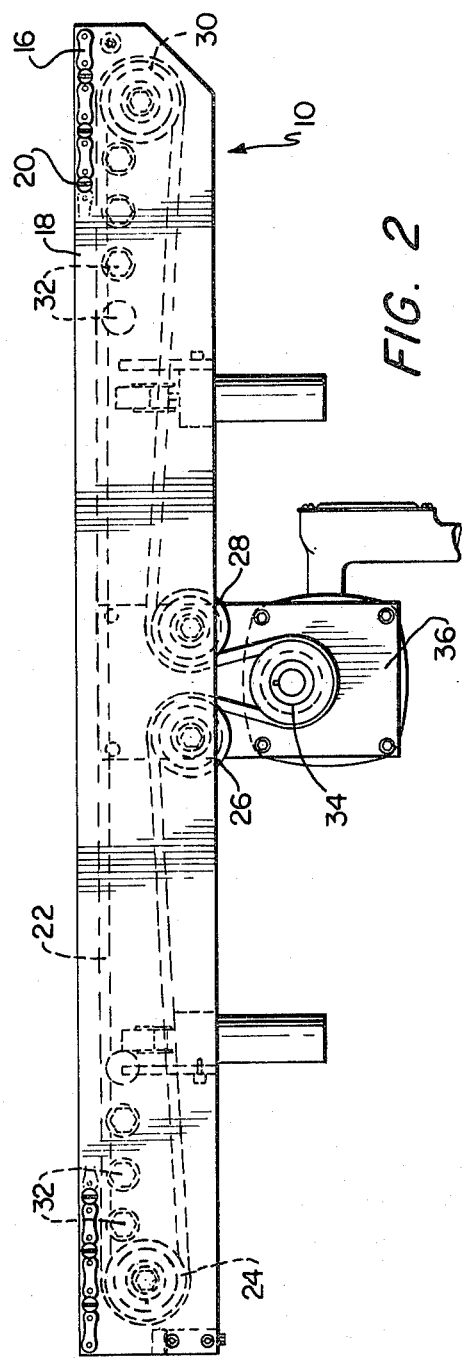
FIG. 2 is a front elevational view of the conveyor.

Running beneath the idler rollers 12 at one end thereof is a belt 22. As will be seen below, this belt 22 provides the driving force for rotation of the freewheeling rollers 12. As can best be seen in FIG. 2, this belt 22 is mounted around a plurality of guide rollers 24, 26, 28 and 30 and above support rolls 32. The belt 22 is driven around drive roll 34, which drive roll 34 is connected to motor means 36, which motor means may be an electric motor, a pneumatic motor or the like.

The belt 22 is preferably a circular rubber or plastic belt, but could, of course, take other shapes. In operation, the motor means 36 operates to rotate drive roll 34, and thus belt 22, continuously.

Mounted beneath the idler rollers 12 at the other end thereof, in one embodiment, is a second belt 38. When employed, this belt 38 is mounted in a non-rotating manner between plates 40 and 42 and upon a bar 43 mounted therebetween. Its operation will be described below.

Figure 3:
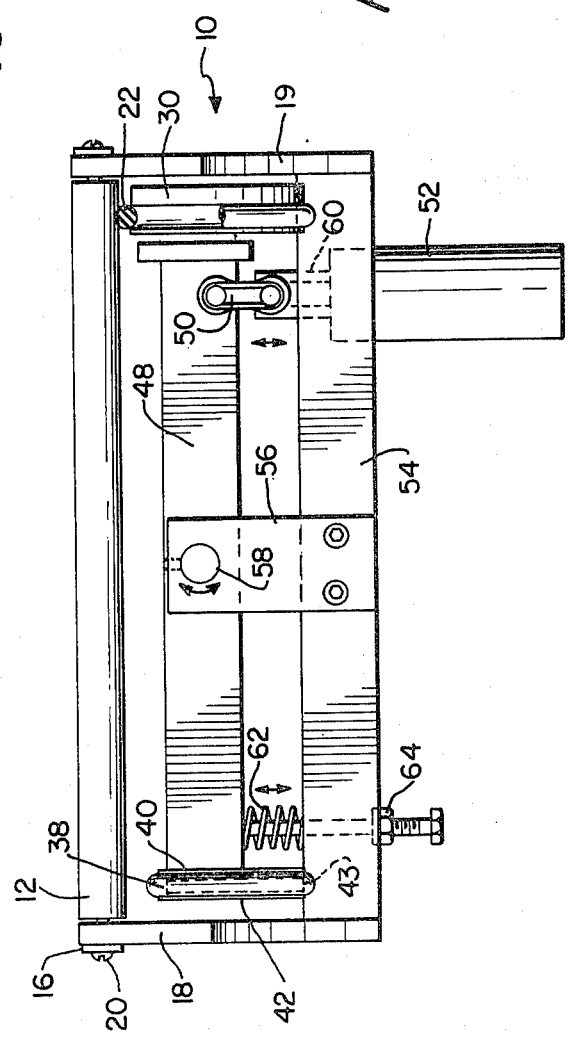
FIG. 3 is a side elevational view of the conveyor.

The driving and braking of the conveyor system 10 is best illustrated in FIG. 3. In FIG. 3, the conveyor 10 is shown in its driven position. The rollers 24, 26, 28, 30 and 32 and thus the belt 22, and the bar 43 and thus belt 38, are mounted on inner frame members 44 and 46 respectively, and not on the outer frame members 18 and 19. The inner frame members 44 and 46 are pivotably mounted upon a pivot member 48. Pivot member 48 is connected by suitable linkage 50 to an air cylinder 52. The pivoting member 48 is also held to the main frame members 18 and 19 by means of frame members 54 and 56, with the pivoting member 48 being pin mounted at 58 to frame member 56.

When driving of the rollers 12 is desired, air pressure is supplied from a source not shown to the air cylinder 52 to force its piston rod 60 outwardly, thus pivoting pivot member 48 about pin 58 to the position shown in FIG. 3 and contacting driven belt 22 firmly against the free-wheeling rollers 12. Adjustable stop means 64 provides a limit to the amount of motion of pivot member 48, thus limiting the amount of pressure between belt 22 and rollers 12.

When driven action is no longer required, air pressure is no longer supplied to the cylinder 52. At that point, spring 62, surrounding stop means 62, pivots pivoting member 48 about pin 58 in the opposite direction, removing belt 22 from contact with the rollers 12. Thus, the conveyor system 10 is normally biased such that the rollers 12 are not driven, and may possibly be braked, as will be seen below, and driving action is applied to the rollers 12 only when an appropriate air signal is given to air cylinder 52.

In one embodiment, a positive braking action is applied to the free-wheeling rollers 12 when driving action is not applied thereto. Thus, when the air signal is removed from the air cylinder 52 and the spring member 62 pivots pivoting member 48 to remove the belt 22 from contact with the rollers 12, brake belt 38 now contacts the rollers 12. The friction supplied by this belt 38, which belt 38 is firmly mounted to resist rotation, brakes the free-wheeling rolling action of the belts 12.

As can be seen in FIG. 1, a plurality of pivoting drive and brake means 48 may be positioned beneath the rollers 12. If more than one pivoting means 48 is provided, these pivoting means 48 act in unison with one another to provide a single drive or brake action to the entire conveyor surface formed by rollers 12. This could be accomplished, for example, by linking the air cylinders 52 to a common air signal supply line. Of course, a plurality of conveyors formed according to the present invention could be located abutting one another, with some conveyors being in their braked condition while others are in their driven condition.

From the foregoing, it is clear that the present invention provides a conveyor mechanism in which the driving means is not subjected to the stress of a braking action.

While presently preferred embodiments of the present invention have been illustrated and described, it will be understood that the invention may be otherwise variously embodied and practiced within the scope of the following claims.

I claim:

1. In a conveyor comprising a conveying surface, said conveying surface being formed of a plurality of freewheeling rollers, and means for driving and braking said rollers, the improvement wherein said means for driving and braking said rollers comprises a bar positioned beneath said rollers and extending for a major portion of the length of said rollers, a pivot upon which said bar is mounted, a driving belt connected to one end of said bar for driving said rollers along one end thereof when said bar is pivoted to a first position, means for driving said driving belt, a braking belt connected to the other end of said bar for braking said rollers along the other end thereof when said bar is pivoted to a second position, means connected at one end of said bar to pivot said bar between said first position and said second position and adjustment means connected to the other end of said bar to regulate contact pressure between said belts and said rollers.

2. The conveyor of claim 1 wherein a plurality of bars are employed.

3. The conveyor of claims 1 or 2 wherein said means to pivot said bars comprises air cylinders.

4. The conveyor of claims 1 or 2 wherein said rollers are mounted on an outer frame and said means for driving and braking said rollers is mounted on an inner frame.

5. The conveyor of claims 1 or 2 wherein said adjustment means comprises an adjustable spring.

6. The conveyor of claims 1 or 2 wherein said means for driving said driving belt comprises a motor.

* * * * *